(12) United States Patent
Zhang et al.

(10) Patent No.: US 12,145,451 B2
(45) Date of Patent: Nov. 19, 2024

(54) PARKING METHOD AND APPARATUS

(71) Applicant: GREAT WALL MOTOR COMPANY LIMITED, Baoding (CN)

(72) Inventors: Shuai Zhang, Baoding (CN); Shujiang Chen, Baoding (CN); Wentao Hou, Baoding (CN); Qing Zhao, Baoding (CN); Xiao Chang, Baoding (CN); Tong Kang, Baoding (CN); Jiaxin Sun, Baoding (CN); Wenchao Ling, Baoding (CN); Weifeng Deng, Baoding (CN)

(73) Assignee: GREAT WALL MOTOR COMPANY LIMITED, Hebei (CN)

( * ) Notice: Subject to any disclaimer, the term of this patent is extended or adjusted under 35 U.S.C. 154(b) by 203 days.

(21) Appl. No.: 17/790,312

(22) PCT Filed: Jan. 13, 2021

(86) PCT No.: PCT/CN2021/071486
§ 371 (c)(1),
(2) Date: Jun. 30, 2022

(87) PCT Pub. No.: WO2021/143723
PCT Pub. Date: Jul. 22, 2021

(65) Prior Publication Data
US 2023/0050845 A1 Feb. 16, 2023

(30) Foreign Application Priority Data
Jan. 16, 2020 (CN) .......................... 202010048724.9

(51) Int. Cl.
*B60L 15/20* (2006.01)
*B60L 7/26* (2006.01)
(Continued)

(52) U.S. Cl.
CPC ............. *B60L 15/2018* (2013.01); *B60L 7/26* (2013.01); *B60T 8/265* (2013.01); *B60T 8/52* (2013.01);
(Continued)

(58) Field of Classification Search
CPC .... B60L 15/2018; B60L 7/26; B60L 2240/12; B60L 2240/423; B60L 2240/642;
(Continued)

(56) References Cited

U.S. PATENT DOCUMENTS 10,220,848 B2 * 3/2019 Ohta ..................... B60W 10/18
11,358,477 B2 * 6/2022 Shiozawa ........... B60L 15/2018

FOREIGN PATENT DOCUMENTS

CN 103978878 8/2014
CN 105882631 8/2016
(Continued)

OTHER PUBLICATIONS

International Search Report for Application No. PCT/CN/2021/071486, mailed Apr. 16, 2021, (4 pages).
(Continued)

*Primary Examiner* — Hai H Huynh
(74) *Attorney, Agent, or Firm* — NIXON PEABODY LLP; Jeffrey L. Costellia

(57) ABSTRACT

The method includes: when the vehicle satisfies a one-pedal activating condition, controlling the vehicle to enter a one-pedal-function activating mode; when the vehicle enters the one-pedal-function activating mode and satisfies a parking-controlling-function activating condition, acquiring current-vehicle-speed information, road-slope information and a first electric-motor recovering torque; based on the current-vehicle-speed information and the road-slope information, calculating to obtain a parking torque; acquiring a first torque difference between the parking torque and the first (Continued)

electric-motor recovering torque; and performing pressure buildup to the vehicle based on the first torque difference, to control the vehicle to complete a parking operation.

16 Claims, 5 Drawing Sheets

(51) Int. Cl.
*B60T 8/26* (2006.01)
*B60T 8/52* (2006.01)

(52) U.S. Cl.
CPC ..... *B60L 2240/12* (2013.01); *B60L 2240/423* (2013.01); *B60L 2240/642* (2013.01); *B60T 2210/10* (2013.01)

(58) Field of Classification Search
CPC ............. B60L 2250/24; B60L 2250/26; B60L 2260/22; B60T 8/265; B60T 8/52; B60T 2210/10; B60T 7/12; B60T 2201/06; B60T 2270/604; B60K 2026/025; Y02T 10/72
USPC .............................................. 701/70, 78, 83
See application file for complete search history.

(56) References Cited

FOREIGN PATENT DOCUMENTS

| | | |
|---|---|---|
| CN | 108349399 | 7/2018 |
| CN | 108349493 | 7/2018 |
| CN | 108909711 | 11/2018 |
| CN | 109130887 | 1/2019 |
| CN | 109515200 | 3/2019 |
| CN | 110605971 | 12/2019 |
| CN | 110605971 A | 12/2019 |
| EP | 1792799 A2 | 6/2007 |
| JP | 2001-071794 A | 3/2001 |
| JP | 2002152903 | 5/2002 |
| JP | 2018-098905 A | 6/2018 |
| KR | 101618453 | 5/2016 |
| WO | WO-2013/065168 | 5/2013 |

OTHER PUBLICATIONS

Chinese Notice and Search Report for Application No. 202010048724.9, mailed Oct. 9, 2021, (8 pages).

Extended European Search Report for App. No. 21741762.5, dated Jan. 9, 2023 (17 pages).

* cited by examiner

PARKING METHOD AND APPARATUS

The present application claims the priority of the Chinese patent application filed on Jan. 16, 2020 before the Chinese Patent Office with the application number of 202010048724.9 and the title of "PARKING METHOD AND APPARATUS", which is incorporated herein in its entirety by reference.

TECHNICAL FIELD

The present disclosure relates to the technical field of vehicle driving, and particularly relates to a parking method and an apparatus.

BACKGROUND

With the energy crisis and air pollution aggravating gradually, new energy vehicles become the main trend of the future automotive industry. In recent years, the controlling concept of "One-Pedal Driving (OPD)" rises gradually in the field of new energy vehicles.

OPD refers to a controlling function that the accelerator pedal, the accelerated, constant-speed and decelerated travelling of a new energy vehicle can be realized by operating the accelerator pedal alone, and by completely releasing the accelerator pedal, the new energy vehicle can be completely stationary. It can reduce the usage frequency of the pedal, improve the capacity utilization ratio and the driving experience of the vehicle, and reduce driving fatigue.

However, the current OPD is realized mainly by the electric-motor controlling in the vehicles, which relies on the recovering capacity of the electric driving system and the electric-motor controlling level of the vehicles. The electric driving system loses the recovery ability under the condition of full battery power, and there is a risk of being incapable of brake-stopping, which results in a poor effect of brake-stopping.

SUMMARY

In view of the above, the present disclosure provides a parking method and an apparatus, to solve the problem of a poor effect of the brake-stopping in the OPD.

In order to achieve the above object, the technical solutions of the present disclosure are realized as follows:

In the first aspect, an embodiment of the present disclosure provides a parking method, wherein the parking method is applied to a vehicle having a hydraulic braking system, and the method includes:
  when the vehicle satisfies a one-pedal activating condition, controlling the vehicle to enter a one-pedal-function activating mode;
  when the vehicle enters the one-pedal-function activating mode and satisfies a parking-controlling-function activating condition, acquiring current-vehicle-speed information, road-slope information and a first electric-motor recovering torque;
  based on the current-vehicle-speed information and the road-slope information, calculating to obtain a parking torque;
  acquiring a first torque difference between the parking torque and the first electric-motor recovering torque; and
  performing pressure buildup to the vehicle based on the first torque difference, to control the vehicle to complete a parking operation.

Optionally, after the step of, when the vehicle satisfies the one-pedal activating condition, controlling the vehicle to enter the one-pedal-function activating mode, the method further includes:
  when the vehicle enters the one-pedal-function activating mode and satisfies a vehicle-stabilization-controlling-function activating condition, generating a hydraulic-compensation increasing instruction; and
  in response to the hydraulic-compensation increasing instruction, controlling the vehicle to complete a vehicle stabilizing operation.

Optionally, after the step of, when the vehicle satisfies the one-pedal activating condition, controlling the vehicle to enter the one-pedal-function activating mode, the method further includes:
  when the vehicle enters the one-pedal-function activating mode and satisfies a vehicle-stabilization-controlling-function exiting condition, generating a hydraulic-compensation reducing instruction; and
  in response to the hydraulic-compensation reducing instruction, exiting the vehicle-stabilization controlling mode.

Optionally, after the step of, when the vehicle satisfies the one-pedal activating condition, controlling the vehicle to enter the one-pedal-function activating mode, the method further includes:
  when the vehicle enters the one-pedal-function activating mode and satisfies a deceleration-controlling-function activating condition, acquiring a current deceleration controlling torque and a second electric-motor recovering torque of the vehicle;
  calculating a second torque difference between the deceleration controlling torque and the second electric-motor recovering torque; and
  performing pressure buildup to the vehicle based on the second torque difference, to control the vehicle to complete a decelerating operation.

Optionally, the hydraulic-compensation increasing instruction includes an instruction for increasing a hydraulic braking force, wherein the hydraulic braking force enables the vehicle to stop within a preset slope range.

In the second aspect, an embodiment of the present disclosure provides a parking apparatus, wherein the parking apparatus is applied to a vehicle having a hydraulic braking system, and the apparatus includes:
  a first controlling module configured for, when the vehicle satisfies a one-pedal activating condition, controlling the vehicle to enter a one-pedal-function activating mode;
  a first acquiring module configured for, when the vehicle enters the one-pedal-function activating mode and satisfies a parking-controlling-function activating condition, acquiring current-vehicle-speed information, road-slope information and a first electric-motor recovering torque;
  a first calculating module configured for, based on the current-vehicle-speed information and the road-slope information, calculating to obtain a parking torque;
  a second acquiring module configured for acquiring a first torque difference between the parking torque and the first electric-motor recovering torque; and
  a second controlling module configured for performing pressure buildup to the vehicle based on the first torque difference, to control the vehicle to complete a parking operation.

Optionally, the apparatus further includes:

a first generating module configured for, when the vehicle enters the one-pedal-function activating mode and satisfies a vehicle-stabilization-controlling-function activating condition, generating a hydraulic-compensation increasing instruction; and a third controlling module configured for, in response to the hydraulic-compensation increasing instruction, controlling the vehicle to complete a vehicle stabilizing operation.

Optionally, the apparatus further includes:

a second generating module configured for, when the vehicle enters the one-pedal-function activating mode and satisfies a vehicle-stabilization-controlling-function exiting condition, generating a hydraulic-compensation reducing instruction; and an exiting module configured for, in response to the hydraulic-compensation reducing instruction, exiting the vehicle-stabilization controlling mode.

Optionally, the apparatus further includes:

a third acquiring module configured for, when the vehicle enters the one-pedal-function activating mode and satisfies a deceleration-controlling-function activating condition, acquiring a current deceleration controlling torque and a second electric-motor recovering torque of the vehicle;

a second calculating module configured for calculating a second torque difference between the deceleration controlling torque and the second electric-motor recovering torque; and a fourth controlling module configured for performing pressure buildup to the vehicle based on the second torque difference, to control the vehicle to complete a decelerating operation.

Optionally, the hydraulic-compensation increasing instruction includes an instruction for increasing a hydraulic braking force, wherein the hydraulic braking force enables the vehicle to stop within a preset slope range.

As compared with the prior art, the embodiments of the present disclosure have the following advantages:

The parking method according to the embodiments of the present disclosure includes, when the vehicle satisfies a one-pedal activating condition, controlling the vehicle to enter a one-pedal-function activating mode; when the vehicle enters the one-pedal-function activating mode and satisfies a parking-controlling-function activating condition, acquiring current-vehicle-speed information, road-slope information and a first electric-motor recovering torque; based on the current-vehicle-speed information and the road-slope information, calculating to obtain a parking torque; acquiring a first torque difference between the parking torque and the first electric-motor recovering torque; and performing pressure buildup to the vehicle based on the first torque difference. Accordingly, even if the electric driving system loses the recovery ability under the condition of full battery power, the vehicle may also perform braking compensation to the vehicle by means of the pressure buildup, to control the vehicle to complete the parking operation, i.e., to enable the vehicle to complete the brake-stopping, which can improve the effect of the brake-stopping of the vehicle, and ensure the drive uniformity.

The above description is merely a summary of the technical solutions of the present disclosure. In order to more clearly know the elements of the present disclosure to enable the implementation according to the contents of the description, and in order to make the above and other purposes, features and advantages of the present disclosure more apparent and understandable, the particular embodiments of the present disclosure are provided below.

BRIEF DESCRIPTION OF THE DRAWINGS

In order to more clearly illustrate the technical solutions of the embodiments of the present disclosure or the prior art, the figures that are required to describe the embodiments or the prior art will be briefly introduced below. Apparently, the figures that are described below are embodiments of the present disclosure, and a person skilled in the art can obtain other figures according to these figures without paying creative work.

The drawings, which form part of the present disclosure, are intended to provide a further understanding of the present disclosure. The illustrative embodiments of the present disclosure and their explanation are intended to interpret the present disclosure, and do not inappropriately limit the present disclosure. In the drawings.

DETAILED DESCRIPTION

In order to make the objects, the technical solutions and the advantages of the embodiments of the present disclosure clearer, the technical solutions of the embodiments of the present disclosure will be clearly and completely described below with reference to the drawings of the embodiments of the present disclosure. Apparently, the described embodiments are merely certain embodiments of the present disclosure, rather than all of the embodiments. All of the other embodiments that a person skilled in the art obtains on the basis of the embodiments of the present disclosure without paying creative work fall within the protection scope of the present disclosure.

It should be noted that, subject to the avoiding of any conflict, the embodiments and the features of the embodiments of the present disclosure may be combined.

The present disclosure will be described in detail below with reference to the drawings and the embodiments.

Figure 1:
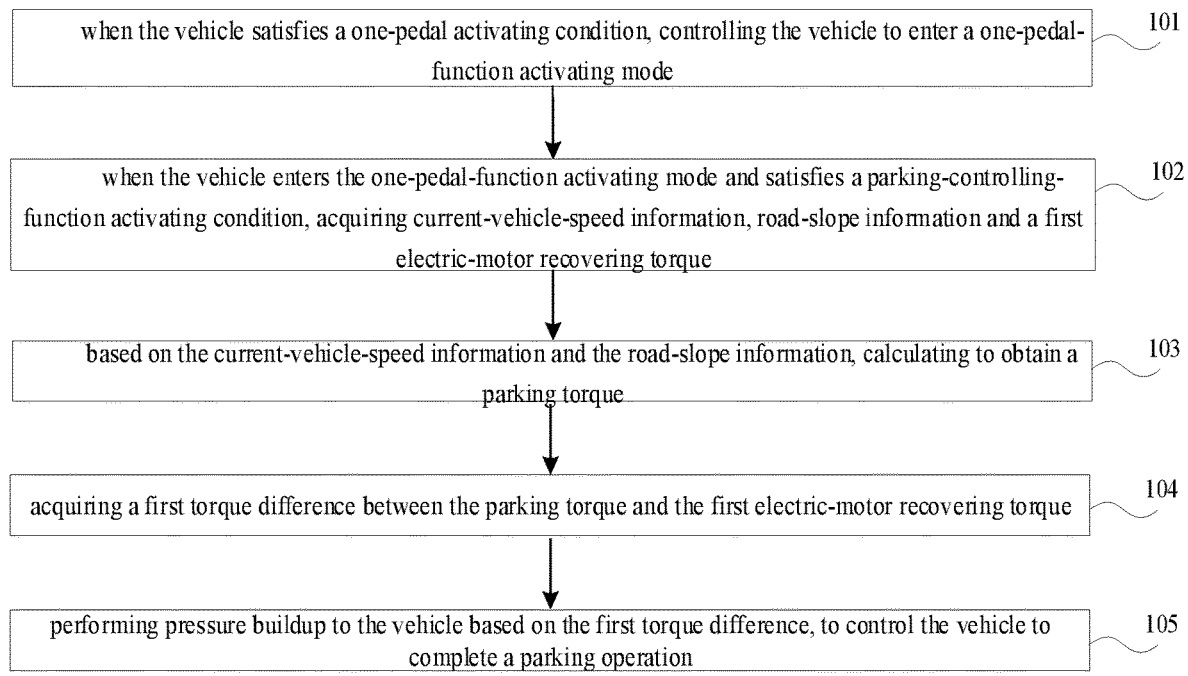
FIG. 1 shows a flow chart of the steps of the parking method according to the first embodiment of the present disclosure.

Referring to FIG. 1, FIG. 1 shows a flow chart of the steps of the parking method according to the first embodiment of the present disclosure. The parking method may be applied to a vehicle having a hydraulic braking system.

As shown in FIG. 1, the parking method may particularly include the following steps:

Step 101: when the vehicle satisfies a one-pedal activating condition, controlling the vehicle to enter a one-pedal-function activating mode.

In an embodiment of the present disclosure, when the vehicle satisfies the following conditions, the vehicle can enter the one-pedal-function activating mode: a one-pedal selecting switch is turned on, the power system has no serious failure, the accelerator pedal has no failure, the snowfield mode is not activated, the current road slope is less than a road slope calibration value, and so on. Certainly, the condition is not limited to those. In a particular implementation, the vehicle may also enter the one-pedal-function activating mode when the vehicle is in other conditions, which may particularly be determined according to actual situations, and is not limited in the embodiments of the present disclosure.

The road slope calibration value may be adjusted according to particular application scenes, and may be 30%, and may also be 35%, which is not particularly limited in the embodiments of the present disclosure.

After the vehicle is controlled to enter the one-pedal-function activating mode, the step 102 is executed.

Step 102: when the vehicle enters the one-pedal-function activating mode and satisfies a parking-controlling-function activating condition, acquiring current-vehicle-speed information, road-slope information and a first electric-motor recovering torque.

In an embodiment of the present disclosure, when the vehicle satisfies the following conditions at the same time, the vehicle satisfies the parking-controlling-function activating condition: the vehicle is in a start-up completing state; the one-pedal function is activated; the current vehicle speed is less than a vehicle-speed calibration value within a vehicle-speed-continuation calibration duration; the accelerator-pedal depth is less than a depth calibration value; the accelerator pedal is not trodden within a pedal-continuation calibration duration or the brake-master-cylinder pressure value of the accelerator pedal is less than a pressure calibration value within a continuation calibration duration; the worming function is not activated; the current gear is in the Drive (D) gear; the Electrical Park Brake (EPB) and the other electronic braking systems are not activated, and so on. Certainly, the condition is not limited to those. In a particular implementation, it may also be determined that the vehicle satisfies the parking-controlling-function activating condition when the vehicle is in other conditions, which may particularly be configured according to actual situations, and is not limited in the embodiments of the present disclosure.

The vehicle-speed calibration value may be 10 kilometers per hour, the vehicle-speed-continuation calibration duration may be 500 milliseconds, the depth calibration value may be 1%, the pressure calibration value may be 4.5 Pa, and the pedal-continuation calibration duration may be 100 milliseconds. Each of the calibration values may be adjusted according to particular application scenes, which is not particularly limited in the embodiments of the present disclosure.

When the vehicle enters the one-pedal-function activating mode and satisfies a parking-controlling-function activating condition, the parking-controlling-function of the vehicle is activated, and the current-vehicle-speed information, the road-slope information and the first electric-motor recovering torque of the vehicle are acquired.

After the current-vehicle-speed information, the road-slope information and the first electric-motor recovering torque are acquired, the step 103 is executed.

Step 103: based on the current-vehicle-speed information and the road-slope information, calculating to obtain a parking torque. The parking torque is the electric-motor torque.

After the current-vehicle-speed information and the road-slope information of the vehicle are acquired, Table 1 shows a schematic diagram of the vehicle speed (Vehicle Speed), the road slope (Road Slope) and the parking torque (Torque, T) according to an embodiment of the present disclosure.

TABLE 1

| | | vehicle speed/kph | | | | | | | | | | | | | |
|---|---|---|---|---|---|---|---|---|---|---|---|---|---|---|---|
| | | 0 | 1 | 2 | 3 | 4 | 5 | 6 | 7 | 8 | 9 | 10 | 12 | 15 | 20 |
| road slope/% | −20% | TBD | TBD | TBD | TBD | TBD | TBD | TBD | TBD | TBD | TBD | TBD | TBD | TBD | TBD |
| | −12% | TBD | TBD | TBD | TBD | TBD | TBD | TBD | TBD | TBD | TBD | TBD | TBD | TBD | TBD |
| | −8% | TBD | TBD | TBD | TBD | TBD | TBD | TBD | TBD | TBD | TBD | TBD | TBD | TBD | TBD |
| | −6% | TBD | TBD | TBD | TBD | TBD | TBD | TBD | TBD | TBD | TBD | TBD | TBD | TBD | TBD |
| | −4% | TBD | TBD | TBD | TBD | TBD | TBD | TBD | TBD | TBD | TBD | TBD | TBD | TBD | TBD |
| | −3% | TBD | TBD | TBD | TBD | TBD | TBD | TBD | TBD | TBD | TBD | TBD | TBD | TBD | TBD |
| | −2% | TBD | TBD | TBD | TBD | TBD | TBD | TBD | TBD | TBD | TBD | TBD | TBD | TBD | TBD |
| | −1% | TBD | TBD | TBD | TBD | TBD | TBD | TBD | TBD | TBD | TBD | TBD | TBD | TBD | TBD |
| | 0% | TBD | TBD | TBD | TBD | TBD | TBD | TBD | TBD | TBD | TBD | TBD | TBD | TBD | TBD |
| | 1% | TBD | TBD | TBD | TBD | TBD | TBD | TBD | TBD | TBD | TBD | TBD | TBD | TBD | TBD |
| | 2% | TBD | TBD | TBD | TBD | TBD | TBD | TBD | TBD | TBD | TBD | TBD | TBD | TBD | TBD |
| | 3% | TBD | TBD | TBD | TBD | TBD | TBD | TBD | TBD | TBD | TBD | TBD | TBD | TBD | TBD |
| | 4% | TBD | TBD | TBD | TBD | TBD | TBD | TBD | TBD | TBD | TBD | TBD | TBD | TBD | TBD |
| | 6% | TBD | TBD | TBD | TBD | TBD | TBD | TBD | TBD | TBD | TBD | TBD | TBD | TBD | TBD |
| | 8% | TBD | TBD | TBD | TBD | TBD | TBD | TBD | TBD | TBD | TBD | TBD | TBD | TBD | TBD |
| | 12% | TBD | TBD | TBD | TBD | TBD | TBD | TBD | TBD | TBD | TBD | TBD | TBD | TBD | TBD |
| | 20% | TBD | TBD | TBD | TBD | TBD | TBD | TBD | TBD | TBD | TBD | TBD | TBD | TBD | TBD |

The parking torque is a scalable quantity (To Be Determine, TBD). Particularly, the theoretical calculating method of the TBD of the parking torque may include: based on the driving performance and the comfortableness, providing the relation between the vehicle acceleration (m/s$^2$) and the vehicle speed (kph), wherein the vehicle acceleration is related to the actual state of the vehicle. Assuming that the acceleration is an, the following table provides a correspondence relation between the one-pedal vehicle acceleration and the one-pedal vehicle speed.

The correspondence relation between the one-pedal vehicle acceleration and the one-pedal vehicle speed

| | vehicle speed/kph | | | | | | | |
|---|---|---|---|---|---|---|---|---|
| | 0 | 2 | 4 | 6 | 8 | 10 | 15 | 20 |
| acceleration/m/s$^2$ | 0.1 | 0.4 | 0.6 | 0.8 | 1 | 1.2 | 1.5 | 1.5 |

According to the Newton's second law, $ma_n$=Ft-Fi, wherein m is the vehicle mass (Kg);

Ft is the vehicle driving force, wherein Ft=$(T*i_o)$/r, wherein T is the electric-motor torque (Nm), $i_o$ is the reduction ratio, and r is the tyre radius; and Fi is the rampway resistance, wherein Fi=m*g*f, wherein g is the gravitational acceleration, and f is the current slope.

Among them, merely the electric-motor torque is an unknown parameter, and the electric-motor torque may be obtained by calculation based on the above formula, i.e., calculating out the parking torque.

In addition, the calculated-out parking torque is a theoretical value, and the actual value may be obtained by trimming on basis of the theoretical value, to adapt to the actual vehicle, which may particularly be determined according to actual situations, and the particular numerical value of the actual value is not limited in the embodiments of the present disclosure.

After the parking torque is obtained by calculation, the step 104 is executed.

Step 104: acquiring a first torque difference between the parking torque and the first electric-motor recovering torque.

After the parking torque of the vehicle is obtained by calculation, by referring to the electric-motor recovering torque obtained in the step 102, subtracting the parking torque and the first electric-motor recovering torque, the first torque difference can be obtained. Further, the step 105 may be performed in the hydraulic braking system of the vehicle according to the first torque difference.

Step 105: performing pressure buildup to the vehicle based on the first torque difference, to control the vehicle to complete a parking operation.

The pressure buildup refers to building up a liquid pressure. In the hydraulic braking system of the vehicle, the hydraulic braking system builds up the liquid pressure with the first torque difference as the controlling target, thereby providing the braking force to the entire vehicle to realize the braking, i.e., controlling the vehicle to complete the parking operation.

The parking method according to the embodiments of the present disclosure includes, when the vehicle satisfies a one-pedal activating condition, controlling the vehicle to enter a one-pedal-function activating mode; when the vehicle enters the one-pedal-function activating mode and satisfies a parking-controlling-function activating condition, acquiring current-vehicle-speed information, road-slope information and a first electric-motor recovering torque; based on the current-vehicle-speed information and the road-slope information, calculating to obtain a parking torque; acquiring a first torque difference between the parking torque and the first electric-motor recovering torque; and performing pressure buildup to the vehicle based on the first torque difference. Accordingly, even if the electric driving system loses the recovery ability under the condition of full battery power, the vehicle may also perform braking compensation to the vehicle by means of the pressure buildup, to control the vehicle to complete the parking operation, i.e., to enable the vehicle to complete the brake-stopping, which can improve the effect of the brake-stopping of the vehicle, and ensure the drive uniformity.

Figure 2:
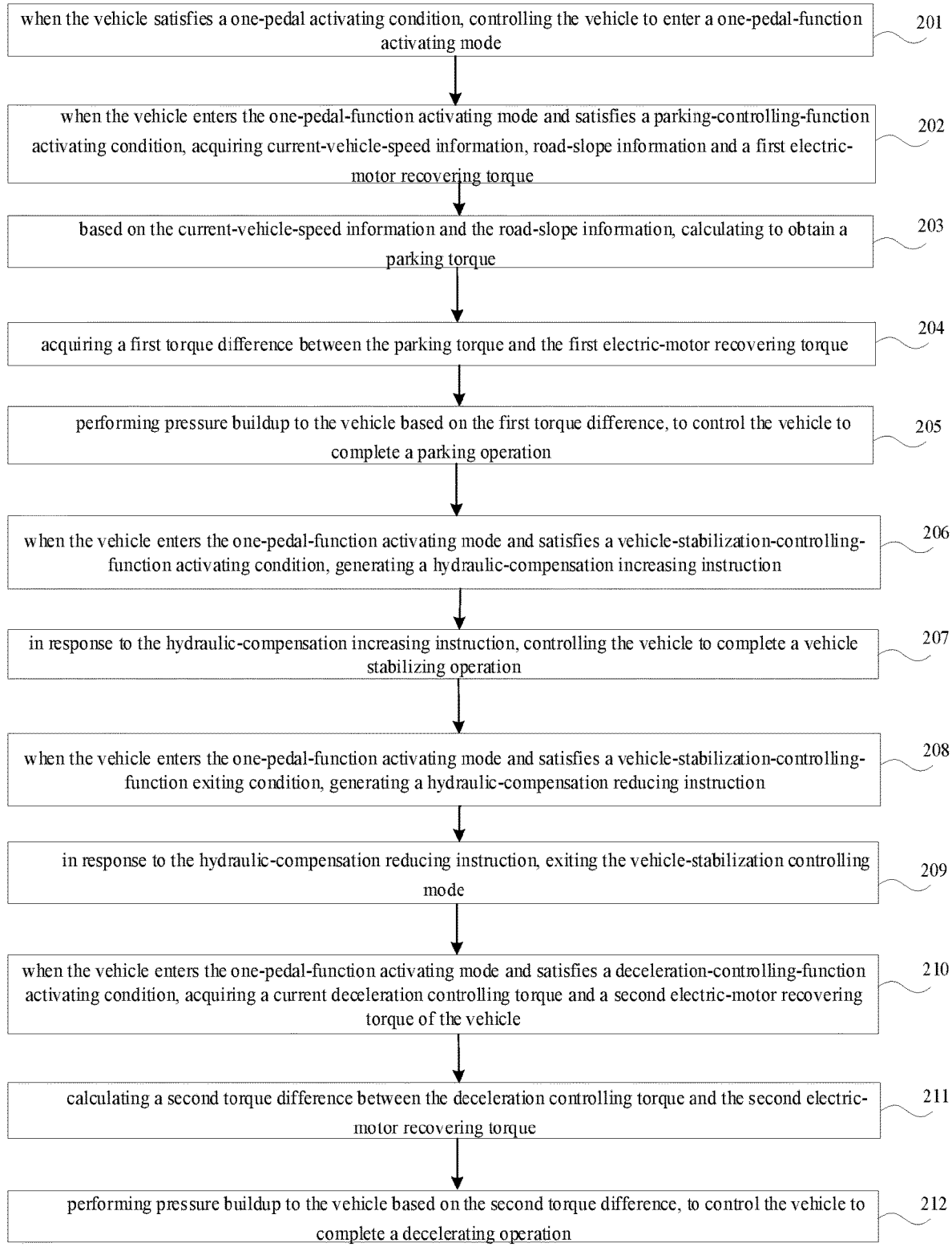
FIG. 2 shows a flow chart of the steps of the parking method according to the second embodiment of the present disclosure.

Referring to FIG. 2, FIG. 2 shows a flow chart of the steps of the parking method according to the second embodiment of the present disclosure. The parking method may be applied to a vehicle having a hydraulic braking system.

As shown in FIG. 2, the parking method may particularly include the following steps:

Step 201: when the vehicle satisfies a one-pedal activating condition, controlling the vehicle to enter a one-pedal-function activating mode.

In an embodiment of the present disclosure, when the vehicle satisfies the following conditions, the vehicle can enter the one-pedal-function activating mode: a one-pedal selecting switch is turned on, the power system has no serious failure, the accelerator pedal has no failure, the snowfield mode is not activated, the current road slope is less than a road slope calibration value, and so on. Certainly, the condition is not limited to those. In a particular implementation, the vehicle may also enter the one-pedal-function activating mode when the vehicle is in other conditions, which may particularly be determined according to actual situations, and is not limited in the embodiments of the present disclosure.

The road slope calibration value may be adjusted according to particular application scenes, and may be 30%, and may also be 35%, which is not particularly limited in the embodiments of the present disclosure.

In addition, when the vehicle satisfies any one of the following conditions, the vehicle may exit the one-pedal function: the one-pedal selecting switch is turned off; the power system has a serious failure; the accelerator pedal has a failure; the snowfield mode is activated; and the current road slope is greater than a calibration value (for example, 32%).

After the vehicle is controlled to enter the one-pedal-function activating mode, the step 202 is executed.

Step 202: when the vehicle enters the one-pedal-function activating mode and satisfies a parking-controlling-function activating condition, acquiring current-vehicle-speed information, road-slope information and a first electric-motor recovering torque.

In an embodiment of the present disclosure, when the vehicle satisfies the following conditions at the same time, the vehicle satisfies the parking-controlling-function activating condition: the vehicle is in a start-up completing state; the one-pedal function is activated; the current vehicle speed is less than a vehicle-speed calibration value within a vehicle-speed-continuation calibration duration; the accelerator-pedal depth is less than a depth calibration value; the accelerator pedal is not trodden within a pedal-continuation calibration duration or the brake-master-cylinder pressure value of the accelerator pedal is less than a pressure calibration value within a continuation calibration duration; the worming function is not activated; the current gear is in the Drive (D) gear; the Electrical Park Brake (EPB) and the other electronic braking systems are not activated, and so on. Certainly, the condition is not limited to those. In a particular implementation, it may also be determined that the vehicle satisfies the parking-controlling-function activating condition when the vehicle is in other conditions, which may particularly be configured according to actual situations, and is not limited in the embodiments of the present disclosure.

The vehicle-speed calibration value may be 10 kilometers per hour, the vehicle-speed-continuation calibration duration may be 500 milliseconds, the depth calibration value may be 1%, the pressure calibration value may be 4.5 Pa, and the pedal-continuation calibration duration may be 100 milliseconds. Each of the calibration values may be adjusted according to particular application scenes, which is not particularly limited in the embodiments of the present disclosure.

When the vehicle enters the one-pedal-function activating mode and satisfies a parking-controlling-function activating condition, the parking-controlling-function of the vehicle is activated, and the current-vehicle-speed information, the road-slope information and the first electric-motor recovering torque of the vehicle are acquired.

After the current-vehicle-speed information, the road-slope information and the first electric-motor recovering torque are acquired, the step 203 is executed.

Step 203: based on the current-vehicle-speed information and the road-slope information, calculating to obtain a parking torque.

After the current-vehicle-speed information and the road-slope information of the vehicle are acquired, FIG. 2 shows a schematic diagram of the vehicle speed (Vehicle Speed), the road slope (Road Slope) and the parking torque (Torque, T) according to an embodiment of the present disclosure. Particularly, the theoretical calculating method of the parking torque (T) may include: based on the driving performance and the comfortableness, providing the relation between the vehicle acceleration (m/s$^2$) and the vehicle speed (kph), wherein the vehicle acceleration is related to the actual state of the vehicle. Assuming that the acceleration is $a_n$, the following table provides a one-pedal correspondence relation between the vehicle acceleration and the vehicle speed.

One-pedal correspondence relation between vehicle acceleration and vehicle speed

| | vehicle speed/kph | | | | | | | |
|---|---|---|---|---|---|---|---|---|
| | 0 | 2 | 4 | 6 | 8 | 10 | 15 | 20 |
| acceleration/m/s$^2$ | 0.1 | 0.4 | 0.6 | 0.8 | 1 | 1.2 | 1.5 | 1.5 |

According to the Newton's second law, $ma_n$=Ft-Fi, wherein m is the vehicle mass (Kg);

Ft is the vehicle driving force, wherein Ft=(T*$i_0$)/r, wherein T is the electric-motor torque (Nm), $i_0$ is the reduction ratio, and r is the tyre radius; and Fi is the rampway resistance, wherein Fi=m*g*f, wherein g is the gravitational acceleration, and f is the current slope.

Among them, merely the electric-motor torque is an unknown parameter, and the electric-motor torque may be obtained by calculation based on the above formula, i.e., calculating out the parking torque.

In addition, the calculated-out parking torque is a theoretical value, and the actual value may be obtained by trimming the theoretical value, to adapt for the actual vehicle, which may particularly be configured according to actual situations, and the particular numerical value of the actual value is not limited in the embodiments of the present disclosure.

After the parking torque is obtained by calculation, the step 204 is executed.

Step 204: acquiring a first torque difference between the parking torque and the first electric-motor recovering torque.

After the parking torque of the vehicle is obtained by calculation, by, by referring to the electric-motor recovering torque obtained in the step 202, subtracting the parking torque and the first electric-motor recovering torque, the first torque difference is obtained. Further, the step 205 may be performed in the hydraulic braking system of the vehicle according to the first torque difference.

Step 205: performing pressure buildup to the vehicle based on the first torque difference, to control the vehicle to complete a parking operation.

In the hydraulic braking system of the vehicle, the hydraulic braking system performs active pressure buildup with the first torque difference as the controlling target, to realize braking, i.e., controlling the vehicle to complete the parking operation.

In addition, when the vehicle satisfies any one of the following conditions, the vehicle may exit the parking controlling function: the vehicle is in a non-start-up completing state; the one-pedal function is in an non-activating state; the vehicle speed is greater than a vehicle-speed calibration value (for example, 12 kph) within a continuation calibration duration (for example, 500 ms); the accelerator-pedal depth is greater than a depth calibration value (for example, 3%); the accelerator pedal is trodden or the brake-master-cylinder pressure is greater than a pressure calibration value (for example, 5 bar) and maintains a calibration duration (for example, 100 ms); the worming function is activated; the gear is not in the D gear; and the electronic hand brake and another electronic braking system are activated.

Step 206: when the vehicle enters the one-pedal-function activating mode and satisfies a vehicle-stabilization-controlling-function activating condition, generating a hydraulic-compensation increasing instruction.

The hydraulic-compensation increasing instruction includes an instruction for increasing a hydraulic braking force, wherein the hydraulic braking force enables the vehicle to stop within a preset slope range.

Particularly, when the vehicle enters the one-pedal-function activating mode and satisfies a vehicle-stabilization-controlling-function activating condition, the vehicle-stabilization controlling function is activated, and the entire-vehicle controller of the vehicle should balance the request for increasing the hydraulic braking force (the hydraulic braking force requires that the vehicle can stop at a slope of at least 30%).

In an embodiment of the present disclosure, when the vehicle satisfies the following conditions at a same time, the vehicle satisfies the vehicle-stabilization-function activating condition: the parking controlling function is activated; the hydraulic-compensation function of the braking system is available; and the vehicle speed is equal to 0kph.

In addition, after the vehicle-stabilization controlling function is activated for three minutes, the entire-vehicle controller should request that the electronic hand brake (EPB) be pulled up.

Step 207: in response to the hydraulic-compensation increasing instruction, controlling the vehicle to complete a vehicle stabilizing operation.

The hydraulic-compensation increasing instruction includes an instruction for increasing a hydraulic braking force, wherein the hydraulic braking force enables the vehicle to stop within a preset slope range. The larger value of the hydraulic braking force and the parking-controlling compensating force is outputted, and the braking system of the vehicle, in response to the hydraulic-compensation instruction, controls the vehicle to complete a vehicle stabilizing operation.

Step 208: when the vehicle enters the one-pedal-function activating mode and satisfies a vehicle-stabilization-controlling-function exiting condition, generating a hydraulic-compensation reducing instruction.

In an embodiment of the present disclosure, when the vehicle satisfies any one of the following conditions, the vehicle satisfies the vehicle-stabilization-controlling-function exiting condition: the vehicle is in a non-start-up completing state; the accelerator-pedal depth is greater than the depth calibration value (for example, 3%) within a continuous calibration duration and the accelerator-pedal-torque request is greater than a vehicle-resistance-torque calibration amount (for example, 5 Nm); the one-pedal function is activated and the worming function is not activated; the brake-master-cylinder pressure is greater than a pressure calibration value (for example, 5 bar) and maintains a continuous calibration duration (for example, 100 ms); the electronic hand brake is pulled up; and the gear is the parking (P) gear.

The hydraulic-compensation reducing instruction includes an instruction for reducing the hydraulic braking force.

Step 209: in response to the hydraulic-compensation reducing instruction, exiting the vehicle-stabilization controlling mode.

The entire-vehicle controller of the vehicle responds to the hydraulic-compensation instruction, to make that the braking system smoothly reduces the hydraulic braking force, to control the vehicle to exit the vehicle-stabilization controlling mode.

Step 210: when the vehicle enters the one-pedal-function activating mode and satisfies a deceleration-controlling-function activating condition, acquiring a current deceleration controlling torque and an electric-motor recovering torque of the vehicle.

Figure 3:
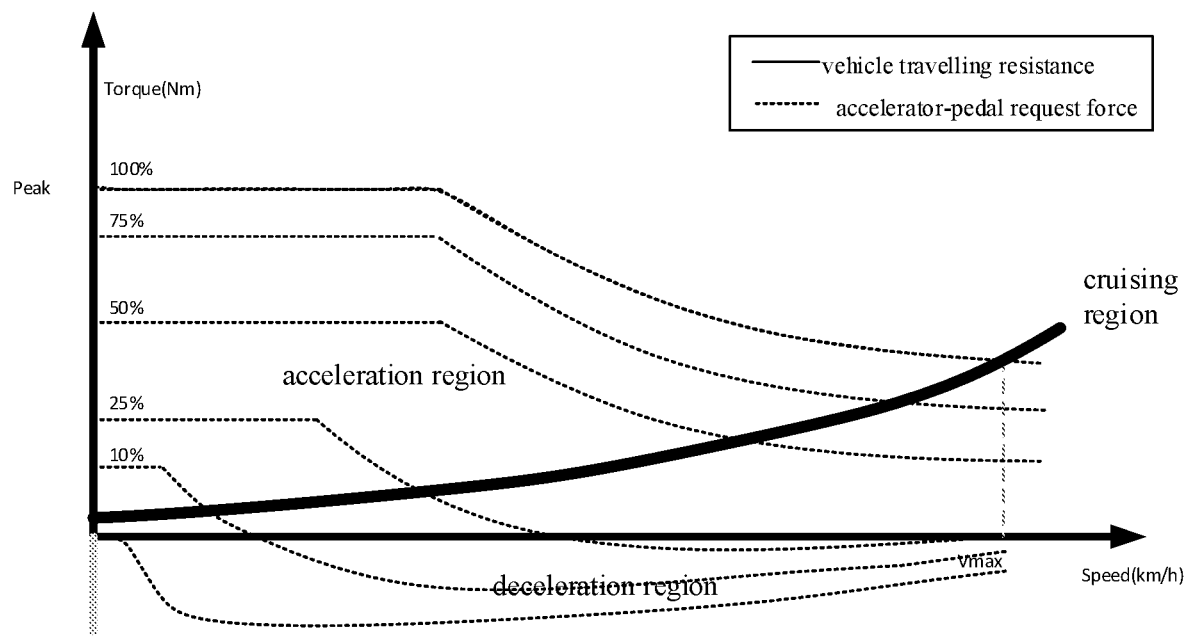
FIG. 3 shows a schematic diagram of the deceleration controlling according to an embodiment of the present disclosure.

FIG. 3 shows a schematic diagram of the deceleration controlling according to an embodiment of the present disclosure. As shown in FIG. 3, the vertical coordinate represents the electric-motor torque (Torque), and the horizontal coordinate represents the vehicle speed (Speed). After the vehicle enters the one-pedal-function activating mode and the deceleration controlling function is activated, the current deceleration controlling torque and the electric-motor recovering torque of the vehicle are acquired.

Step 211: calculating a second torque difference between the deceleration controlling torque and the second electric-motor recovering torque.

The entire-vehicle controller of the vehicle subtracts the deceleration controlling torque and the second electric-motor recovering torque, to obtain the difference between them, i.e., to obtain the second torque difference, and sends the difference to the hydraulic braking system of the vehicle to execute the step 212.

Step 212: performing pressure buildup to the vehicle based on the second torque difference, to control the vehicle to complete a decelerating operation.

The hydraulic braking system of the vehicle builds up the liquid pressure with the second torque difference as the controlling target, thereby providing the braking force to the entire vehicle to realize the braking, i.e., controlling the vehicle to complete the decelerating operation.

Figure 4:
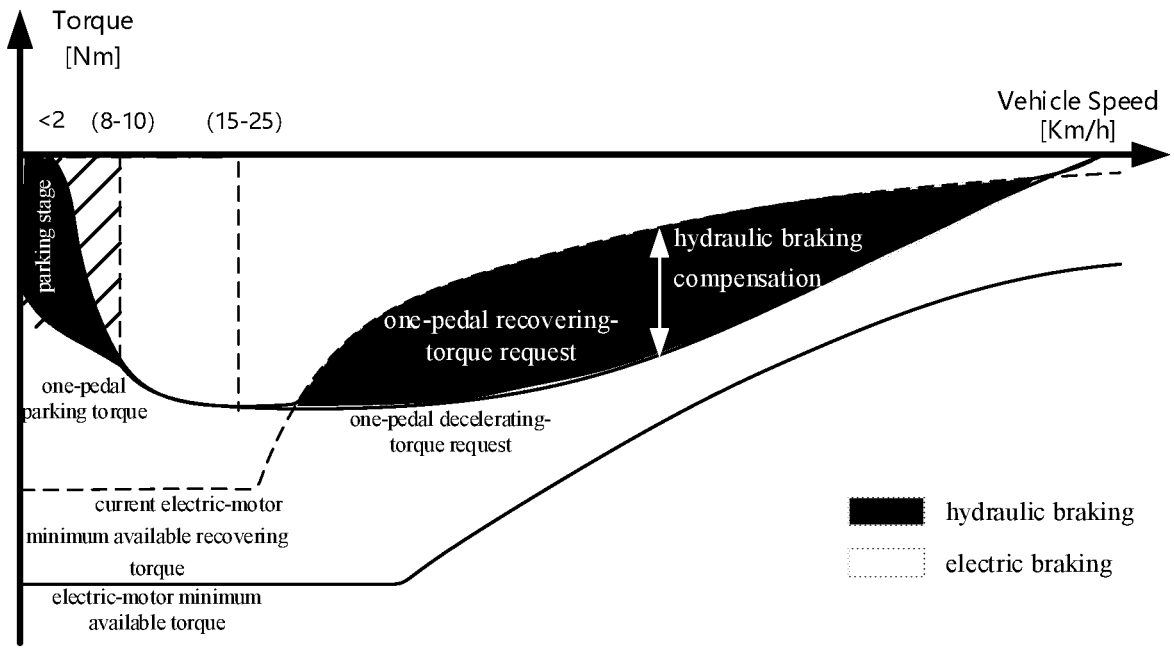
FIG. 4 shows a schematic diagram of the principle of the one-pedal brake-stopping according to an embodiment of the present disclosure.

FIG. 4 shows a schematic diagram of the principle of the one-pedal brake-stopping according to an embodiment of the present disclosure. As shown in FIG. 4, the horizontal axis represents the vehicle speed (Vehicle Speed), and the longitudinal axis represents the torque (Torque). The vehicle speed and the torque are calibration quantities, and may be adaptively calibrated according to different demands.

The parking method according to the embodiments of the present disclosure includes, when the vehicle satisfies a one-pedal activating condition, controlling the vehicle to enter a one-pedal-function activating mode; when the vehicle enters the one-pedal-function activating mode and satisfies a parking-controlling-function activating condition, acquiring current-vehicle-speed information, road-slope information and a first electric-motor recovering torque; based on the current-vehicle-speed information and the road-slope information, calculating to obtain a parking torque; acquiring a first torque difference between the parking torque and the first electric-motor recovering torque; performing pressure buildup to the vehicle based on the first torque difference, to control the vehicle to complete a parking operation; when the vehicle enters the one-pedal-function activating mode and satisfies a vehicle-stabilization-controlling-function activating condition, generating a hydraulic-compensation increasing instruction; in response to the hydraulic-compensation increasing instruction, controlling the vehicle to complete a vehicle stabilizing operation; when the vehicle enters the one-pedal-function activating mode and satisfies a vehicle-stabilization-controlling-function exiting condition, generating a hydraulic-compensation reducing instruction; in response to the hydraulic-compensation reducing instruction, exiting the vehicle-stabilization controlling mode; when the vehicle enters the one-pedal-function activating mode and satisfies a deceleration-controlling-function activating condition, acquiring a current deceleration controlling torque and a second electric-motor recovering torque of the vehicle; calculating a second torque difference between the deceleration controlling torque and the second electric-motor recovering torque; and performing pressure buildup to the vehicle based on the second torque difference, to control the vehicle to complete a decelerating operation. Accordingly, even if the electric driving system loses the recovery ability under the condition of full battery power, the vehicle may also perform braking compensation to the vehicle by means of the pressure buildup, to control the vehicle to complete the brake-stopping, which can improve the effect of the brake-stopping of the vehicle, and ensure the drive uniformity.

Figure 5:
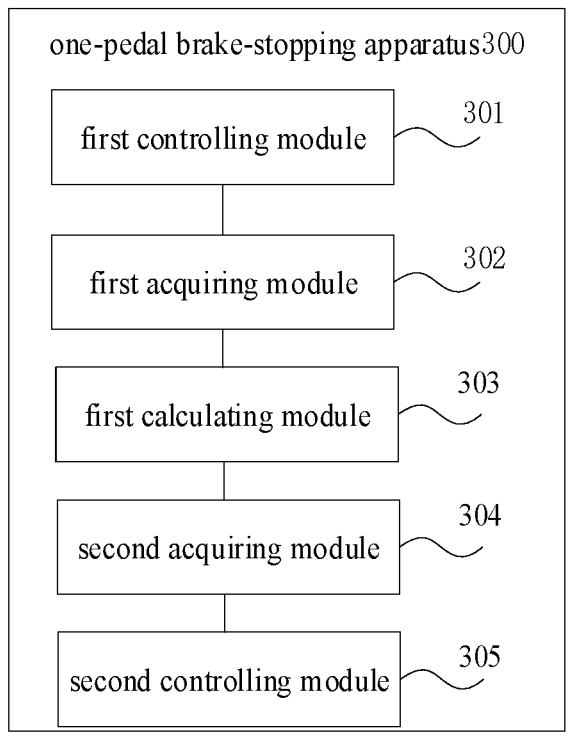
FIG. 5 shows a schematic structural diagram of the parking apparatus according to the third embodiment of the present disclosure.

Referring to FIG. 5, FIG. 5 shows a schematic structural diagram of the parking apparatus according to the third embodiment of the present disclosure. The parking apparatus may be applied to a vehicle having a hydraulic braking system.

As shown in FIG. 5, the parking apparatus 300 may particularly include:

a first controlling module 301 configured for, when the vehicle satisfies a one-pedal activating condition, controlling the vehicle to enter a one-pedal-function activating mode;

a first acquiring module 302 configured for, when the vehicle enters the one-pedal-function activating mode and satisfies a parking-controlling-function activating condition, acquiring current-vehicle-speed information, road-slope information and a first electric-motor recovering torque;

a first calculating module 303 configured for, based on the current-vehicle-speed information and the road-slope information, calculating to obtain a parking torque;

a second acquiring module 304 configured for acquiring a first torque difference between the parking torque and the first electric-motor recovering torque; and a second controlling module 305 configured for performing pressure buildup to the vehicle based on the first torque difference, to control the vehicle to complete a parking operation.

Optionally, the apparatus further includes:

a first generating module configured for, when the vehicle enters the one-pedal-function activating mode and satisfies a vehicle-stabilization-controlling-function activating condition, generating a hydraulic-compensation increasing instruction; and a third controlling module configured for, in response to the hydraulic-compensation increasing instruction, controlling the vehicle to complete a vehicle stabilizing operation.

Optionally, the apparatus further includes:

a second generating module configured for, when the vehicle enters the one-pedal-function activating mode and satisfies a vehicle-stabilization-controlling-function exiting condition, generating a hydraulic-compensation reducing instruction; and an exiting module configured for, in response to the hydraulic-compensation reducing instruction, exiting the vehicle-stabilization controlling mode.

Optionally, the apparatus further includes:

a third acquiring module configured for, when the vehicle enters the one-pedal-function activating mode and satisfies a deceleration-controlling-function activating condition, acquiring a current deceleration controlling torque and a second electric-motor recovering torque of the vehicle;

a second calculating module configured for calculating a second torque difference between the deceleration controlling torque and the second electric-motor recovering torque; and a fourth controlling module configured for performing pressure buildup to the vehicle based on the second torque difference, to control the vehicle to complete a decelerating operation.

Optionally, the hydraulic-compensation increasing instruction includes an instruction for increasing a hydraulic braking force, wherein the hydraulic braking force enables the vehicle to stop within a preset slope range.

The particular implementations of the parking apparatus according to the embodiments of the present disclosure have already been described in detail in the process section, and are not discussed herein further.

In the embodiments of the present disclosure, the parking apparatus can, by using the first controlling module, when the vehicle satisfies a one-pedal activating condition, control the vehicle to enter a one-pedal-function activating mode; subsequently, by using the first acquiring module, when the vehicle enters the one-pedal-function activating mode and satisfies a parking-controlling-function activating condition, acquire current-vehicle-speed information, road-slope information and a first electric-motor recovering torque; by using the first calculating module, based on the current-vehicle-speed information and the road-slope information, calculate to obtain a parking torque; by using the second acquiring module, acquire a first torque difference between the parking torque and the first electric-motor recovering torque; and by using the second controlling module, perform pressure buildup to the vehicle based on the first torque difference. Accordingly, even if the electric driving system loses the recovery ability under the condition of full battery power, the vehicle may also perform braking compensation to the vehicle by means of the pressure buildup, to control the vehicle to complete the parking operation, i.e., to enable the vehicle to complete the brake-stopping, which can improve the effect of the brake-stopping of the vehicle, and ensure the drive uniformity.

The above description is merely preferable embodiments of the present disclosure, and is not indented to limit the present disclosure. Any modifications, equivalent substitutions and improvements that are made within the spirit and the principle of the present disclosure should fall within the protection scope of the present disclosure.

The above-described device embodiments are merely illustrative, wherein the units that are described as separate components may or may not be physically separate, and the components that are displayed as units may or may not be physical units; in other words, they may be located at the same one location, and may also be distributed to a plurality of network units. Some or all of the modules may be selected according to the actual demands to realize the purposes of the solutions of the embodiments. A person skilled in the art can understand and execute the technical solutions without paying creative work.

Each component embodiment of the present disclosure may be implemented by hardware, or by software modules that are operated on one or more processors, or by a combination thereof. A person skilled in the art should understand that some or all of the functions of some or all of the components of the computing and processing device according to the embodiments of the present disclosure may be implemented by using a microprocessor or a digital signal processor (DSP) in practice. The present disclosure may also be implemented as apparatus or device programs (for example, computer programs and computer program products) for implementing part of or the whole of the method described herein. Such programs for implementing the present disclosure may be stored in a computer-readable medium, or may be in the form of one or more signals. Such signals may be downloaded from an Internet website, or provided on a carrier signal, or provided in any other forms.

Figure 6:
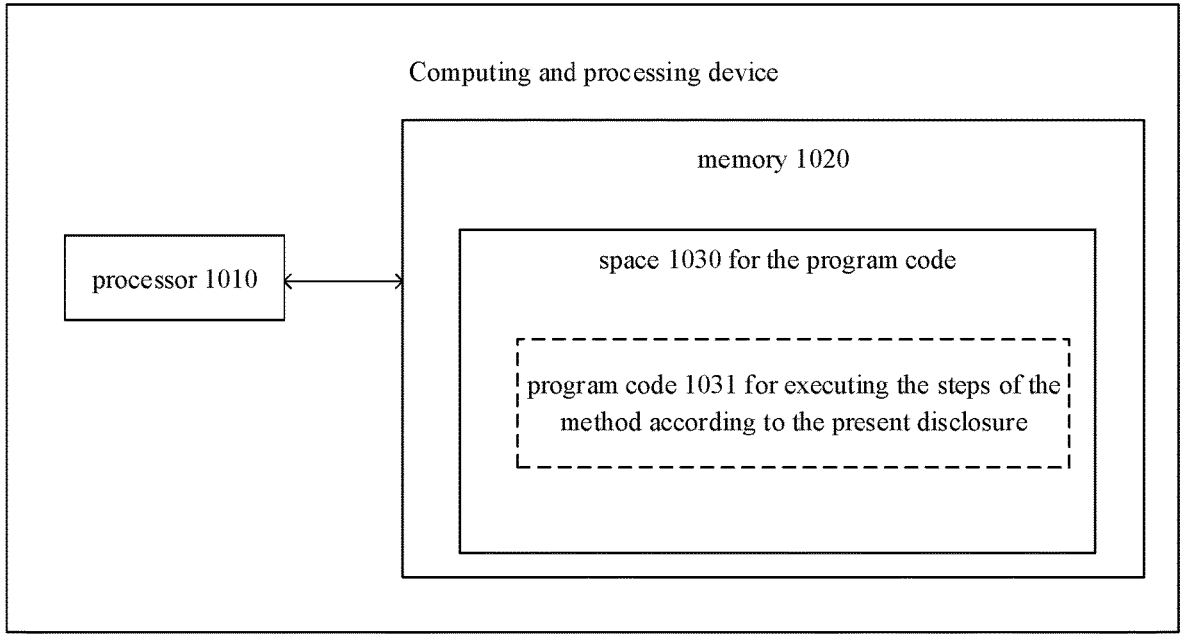
FIG. 6 schematically shows a block diagram of a computing and processing device for executing the method according to the present disclosure.
Figure 7:
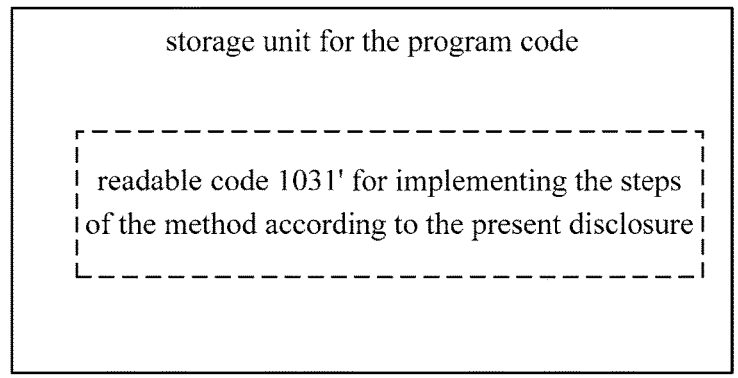
FIG. 7 schematically shows a storage unit for maintaining or carrying a program code for implementing the method according to the present disclosure.

For example, FIG. 6 shows a computing and processing device that can execute the method according to the present disclosure. The computing and processing device traditionally includes a processor 1010 and a computer program product or computer-readable medium in the form of a memory 1020. The memory 1020 may be electronic memories such as flash memory, EEPROM (Electrically Erasable Programmable Read Only Memory), EPROM, hard disk or ROM. The memory 1020 has the storage space 1030 of the program code 1031 for implementing any steps of the above method. For example, the storage space 1030 for program code may contain program codes 1031 for individually implementing each of the steps of the above method. Those program codes may be read from one or more computer program products or be written into the one or more computer program products. Those computer program products include program code carriers such as a hard disk, a compact disk (CD), a memory card or a floppy disk. Such computer program products are usually portable or fixed storage units as shown in FIG. 7. The storage unit may have storage segments or storage spaces with similar arrangement to the memory 1020 of the computing and processing device in FIG. 6. The program codes may, for example, be compressed in a suitable form. Generally, the storage unit contains a computer-readable code 1031', which can be read by a processor like 1010. When those codes are executed by the computing and processing device, the codes cause the computing and processing device to execute each of the steps of the method described above.

The "one embodiment", "an embodiment" or "one or more embodiments" as used herein means that particular features, structures or characteristics described with reference to an embodiment are included in at least one embodiment of the present disclosure. Moreover, it should be noted that here an example using the wording "in an embodiment" does not necessarily refer to the same one embodiment.

The description provided herein describes many concrete details. However, it can be understood that the embodiments of the present disclosure may be implemented without those concrete details. In some of the embodiments, well-known processes, structures and techniques are not described in detail, so as not to affect the understanding of the description.

In the claims, any reference signs between parentheses should not be construed as limiting the claims. The word "comprise" does not exclude elements or steps that are not listed in the claims. The word "a" or "an" preceding an element does not exclude the existing of a plurality of such elements. The present disclosure may be implemented by means of hardware comprising several different elements and by means of a properly programmed computer. In unit claims that list several devices, some of those devices may be embodied by the same item of hardware. The words first, second, third and so on do not denote any order. Those words may be interpreted as names.

Finally, it should be noted that the above embodiments are merely intended to explain the technical solutions of the present disclosure, and not to limit them. Although the present disclosure is explained in detail with reference to the above embodiments, a person skilled in the art should understand that he can still modify the technical solutions set forth by the above embodiments, or make equivalent substitutions to part of the technical features of them. However, those modifications or substitutions do not make the essence of the corresponding technical solutions depart from the spirit and scope of the technical solutions of the embodiments of the present disclosure.

The invention claimed is:

1. A parking method, wherein the parking method is applied to a vehicle having a hydraulic braking system, and the method comprises:
    by one or more processors, when the vehicle satisfies a one-pedal activating condition, controlling the vehicle to enter a one-pedal-function activating mode;
    by one or more processors, when the vehicle enters the one-pedal-function activating mode and satisfies a parking-controlling-function activating condition, acquiring current-vehicle-speed information, road-slope information and a first electric-motor recovering torque;
    by one or more processors, based on the current-vehicle-speed information and the road-slope information, calculating to obtain a parking torque;
    by one or more processors, acquiring a first torque difference between the parking torque and the first electric-motor recovering torque; and
    by one or more processors, performing pressure buildup to the vehicle based on the first torque difference, to control the vehicle to complete a parking operation,
    wherein the satisfying the parking-controlling-function activating condition at least comprises: the accelerator-pedal depth being less than a depth calibration value; the accelerator pedal being not trodden within a pedal-continuation calibration duration or the brake-master-cylinder pressure value of the accelerator pedal being less than a pressure calibration value within a continuation calibration duration.

2. The method according to claim 1, wherein after the step of, when the vehicle satisfies the one-pedal activating condition, controlling the vehicle to enter the one-pedal-function activating mode, the method further comprises:
    when the vehicle enters the one-pedal-function activating mode and satisfies a vehicle-stabilization-controlling-function activating condition, generating a hydraulic-compensation increasing instruction; and
    in response to the hydraulic-compensation increasing instruction, controlling the vehicle to complete a vehicle stabilizing operation.

3. The method according to claim 2, wherein after the step of, when the vehicle satisfies the one-pedal activating condition, controlling the vehicle to enter the one-pedal-function activating mode, the method further comprises:
    when the vehicle enters the one-pedal-function activating mode and satisfies a vehicle-stabilization-controlling-function exiting condition, generating a hydraulic-compensation reducing instruction; and
    in response to the hydraulic-compensation reducing instruction, exiting the vehicle-stabilization controlling mode.

4. The method according to claim 2, wherein the hydraulic-compensation increasing instruction comprises an instruction for increasing a hydraulic braking force, wherein the hydraulic braking force enables the vehicle to stop within a preset slope range.

5. The method according to claim 1, wherein after the step of, when the vehicle satisfies the one-pedal activating condition, controlling the vehicle to enter the one-pedal-function activating mode, the method further comprises:
    when the vehicle enters the one-pedal-function activating mode and satisfies a deceleration-controlling-function activating condition, acquiring a current deceleration controlling torque and a second electric-motor recovering torque of the vehicle;
    calculating a second torque difference between the deceleration controlling torque and the second electric-motor recovering torque; and
    performing pressure buildup to the vehicle based on the second torque difference, to control the vehicle to complete a decelerating operation.

6. A computer-readable medium, wherein the computer-readable medium stores a computer-readable code, and when the computer-readable code is executed, a parking method according to claim 1 is performed.

7. A parking apparatus, wherein the parking apparatus is applied to a vehicle having a hydraulic braking system, and the apparatus comprises:
    one or more processors and a storage apparatus; and
    the storage apparatus stores a computer program which, when executed by the processor, perform the operations comprising:
    when the vehicle satisfies a one-pedal activating condition, controlling the vehicle to enter a one-pedal-function activating mode;
    when the vehicle enters the one-pedal-function activating mode and satisfies a parking-controlling-function activating condition, acquiring current-vehicle-speed information, road-slope information and a first electric-motor recovering torque;
    based on the current-vehicle-speed information and the road-slope information, calculating to obtain a parking torque;
    acquiring a first torque difference between the parking torque and the first electric-motor recovering torque; and performing pressure buildup to the vehicle based on the first torque difference, to control the vehicle to complete a parking operation, wherein the satisfying the parking-controlling-function activating condition at least comprises: the accelerator-pedal depth being less than a depth calibration value; the accelerator pedal being not trodden within a pedal-continuation calibration duration or the brake-master-cylinder pressure value of the accelerator pedal being less than a pressure calibration value within a continuation calibration duration.

8. The parking apparatus according to claim 7, wherein the operations further comprise:

when the vehicle enters the one-pedal-function activating mode and satisfies a vehicle-stabilization-controlling-function activating condition, generating a hydraulic-compensation increasing instruction; and in response to the hydraulic-compensation increasing instruction, controlling the vehicle to complete a vehicle stabilizing operation.

9. The parking apparatus according to claim 8, wherein the apparatus further comprises:

when the vehicle enters the one-pedal-function activating mode and satisfies a vehicle-stabilization-controlling-function exiting condition, generating a hydraulic-compensation reducing instruction; and in response to the hydraulic-compensation reducing instruction, exiting the vehicle-stabilization controlling mode.

10. The parking apparatus according to claim 8, wherein the hydraulic-compensation increasing instruction comprises an instruction for increasing a hydraulic braking force, wherein the hydraulic braking force enables the vehicle to stop within a preset slope range.

11. The parking apparatus according to claim 7, wherein the operations further comprise:

when the vehicle enters the one-pedal-function activating mode and satisfies a deceleration-controlling-function activating condition, acquiring a current deceleration controlling torque and a second electric-motor recovering torque of the vehicle;

calculating a second torque difference between the deceleration controlling torque and the second electric-motor recovering torque; and performing pressure buildup to the vehicle based on the second torque difference, to control the vehicle to complete a decelerating operation.

12. A computing and processing device, wherein the computing and processing device comprises:

a memory storing a computer-readable code; and one or more processors, wherein when the computer-readable code is executed by the one or more processors, the computing and processing device executes a parking method, wherein the parking method is applied to a vehicle having a hydraulic braking system, and the method comprises:

when the vehicle satisfies a one-pedal activating condition, controlling the vehicle to enter a one-pedal-function activating mode;

when the vehicle enters the one-pedal-function activating mode and satisfies a parking-controlling-function activating condition, acquiring current-vehicle-speed information, road-slope information and a first electric-motor recovering torque;

based on the current-vehicle-speed information and the road-slope information, calculating to obtain a parking torque;

acquiring a first torque difference between the parking torque and the first electric-motor recovering torque; and performing pressure buildup to the vehicle based on the first torque difference, to control the vehicle to complete a parking operation, wherein the satisfying the parking-controlling-function activating condition at least comprises: the accelerator-pedal depth being less than a depth calibration value; the accelerator pedal being not trodden within a pedal-continuation calibration duration or the brake-master-cylinder pressure value of the accelerator pedal being less than a pressure calibration value within a continuation calibration duration.

13. The computing and processing device according to claim 12, wherein after the step of, when the vehicle satisfies the one-pedal activating condition, controlling the vehicle to enter the one-pedal-function activating mode, the method further comprises:

when the vehicle enters the one-pedal-function activating mode and satisfies a vehicle-stabilization-controlling-function activating condition, generating a hydraulic-compensation increasing instruction; and in response to the hydraulic-compensation increasing instruction, controlling the vehicle to complete a vehicle stabilizing operation.

14. The computing and processing device according to claim 13, wherein after the step of, when the vehicle satisfies the one-pedal activating condition, controlling the vehicle to enter the one-pedal-function activating mode, the method further comprises:

when the vehicle enters the one-pedal-function activating mode and satisfies a vehicle-stabilization-controlling-function exiting condition, generating a hydraulic-compensation reducing instruction; and in response to the hydraulic-compensation reducing instruction, exiting the vehicle-stabilization controlling mode.

15. The computing and processing device according to claim 13, wherein the hydraulic-compensation increasing instruction comprises an instruction for increasing a hydraulic braking force, wherein the hydraulic braking force enables the vehicle to stop within a preset slope range.

16. The computing and processing device according to claim 12, wherein after the step of, when the vehicle satisfies the one-pedal activating condition, controlling the vehicle to enter the one-pedal-function activating mode, the method further comprises:

when the vehicle enters the one-pedal-function activating mode and satisfies a deceleration-controlling-function activating condition, acquiring a current deceleration controlling torque and a second electric-motor recovering torque of the vehicle;

calculating a second torque difference between the deceleration controlling torque and the second electric-motor recovering torque; and performing pressure buildup to the vehicle based on the second torque difference, to control the vehicle to complete a decelerating operation.

* * * * *